United States Patent

Bondurant

[15] 3,699,769
[45] Oct. 24, 1972

[54] TEMPERATURE CHANGE ACTUATED MOTOR

[72] Inventor: John C. Bondurant, 219 East Clinton Street, Hickman, Ky. 42050

[22] Filed: April 22, 1971

[21] Appl. No.: 136,395

[52] U.S. Cl. ................................................. 60/23
[51] Int. Cl. .............................................. F03g 7/06
[58] Field of Search .............................. 60/23–25

[56] References Cited

UNITED STATES PATENTS

| 685,269 | 10/1901 | Fulton | 60/23 |
| 3,142,149 | 7/1964 | Hays | 60/23 |

FOREIGN PATENTS OR APPLICATIONS

| 624,299 | 4/1927 | France | 60/23 |

Primary Examiner—Martin P. Schwadron
Assistant Examiner—A. M. Ostrager
Attorney—Clarence A. O'Brien and Harvey B. Jacobson

[57] ABSTRACT

A battery of side-by-side tubes constructed of a material having a high coefficient of expansion is provided and one set of ends of the tubes are stationarily supported from a suitable base. A power shaft is rotatably journalled on an axis stationary relative to the base and the shaft includes a ratchet wheel for each tube. Each tube has a pair of ratchet paws operatively associated therewith engaged with the corresponding ratchet wheel through suitable motion transmitting structure and the expansion and contraction of each tube above a predetermined magnitude is operative to rotate the shaft. A hot air manifold and a cold air manifold extend along one set of ends of the tubes and valve structure is provided for alternately communicating the interior of the manifolds with the interiors of the tubes, the valve structures being alternately driven through open and closed positions from the shaft and the remote ends of the tubes being provided with damper controlled air discharge structure.

12 Claims, 9 Drawing Figures

PATENTED OCT 24 1972 3,699,769
SHEET 1 OF 3
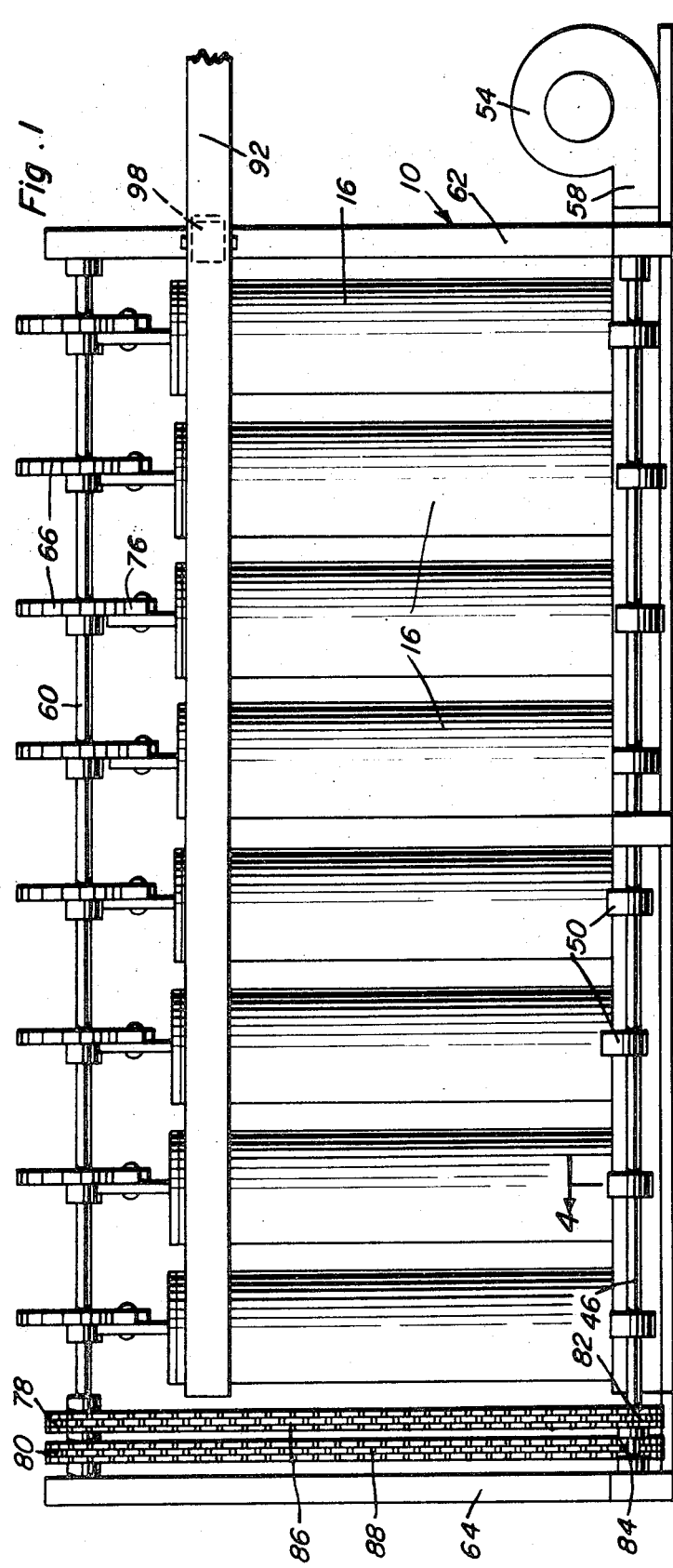
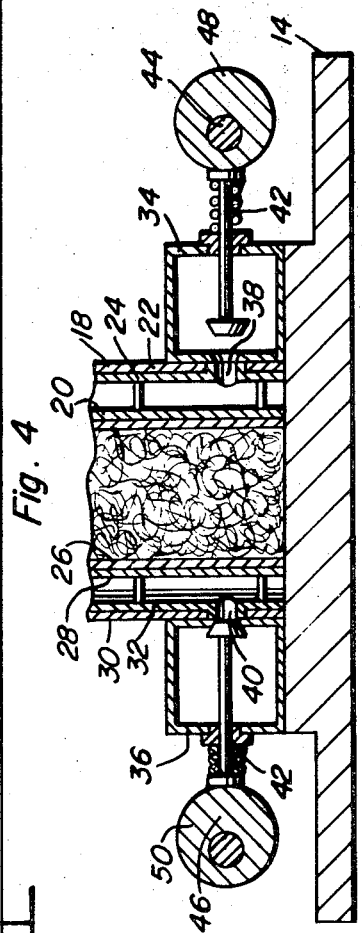
John C. Bondurant
INVENTOR.
BY Clarence A. O'Brien
and Harvey B. Jacobson
Attorneys

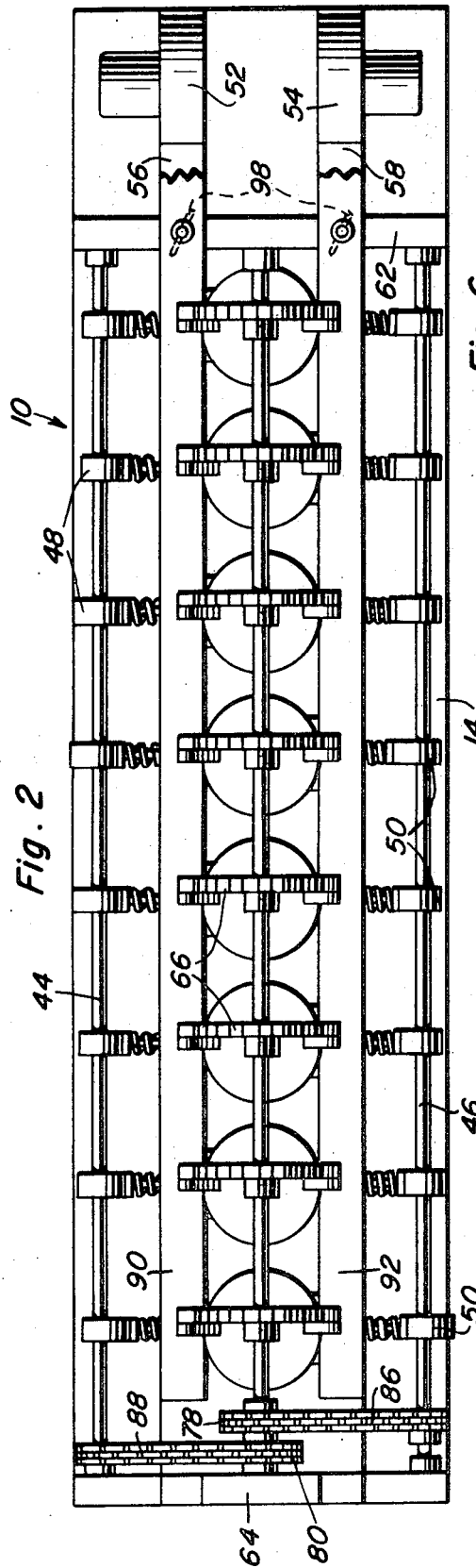
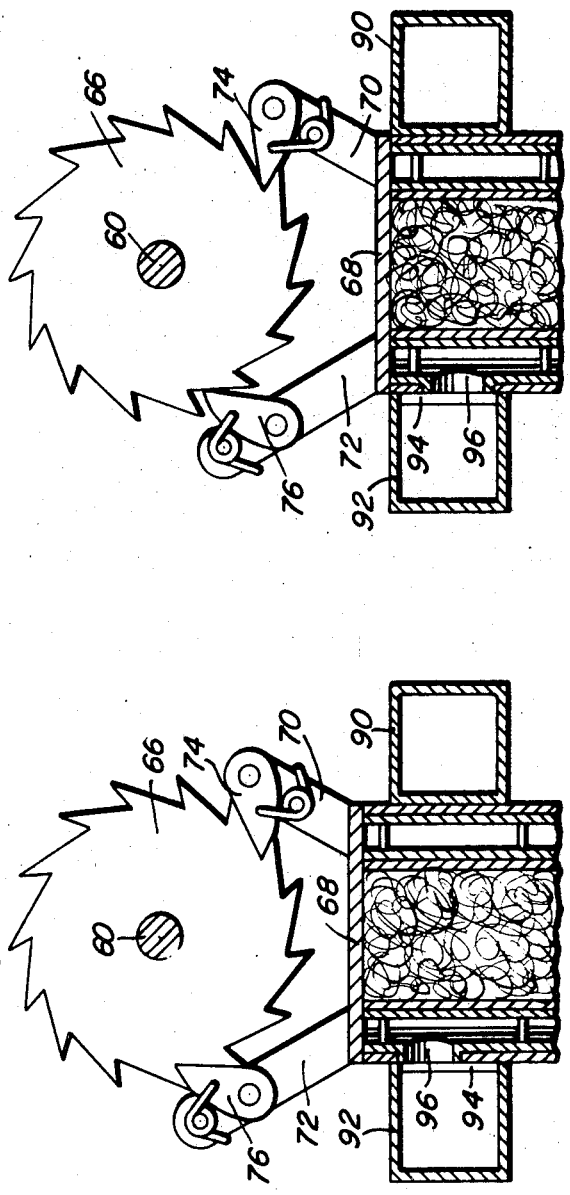
John C. Bondurant
INVENTOR.

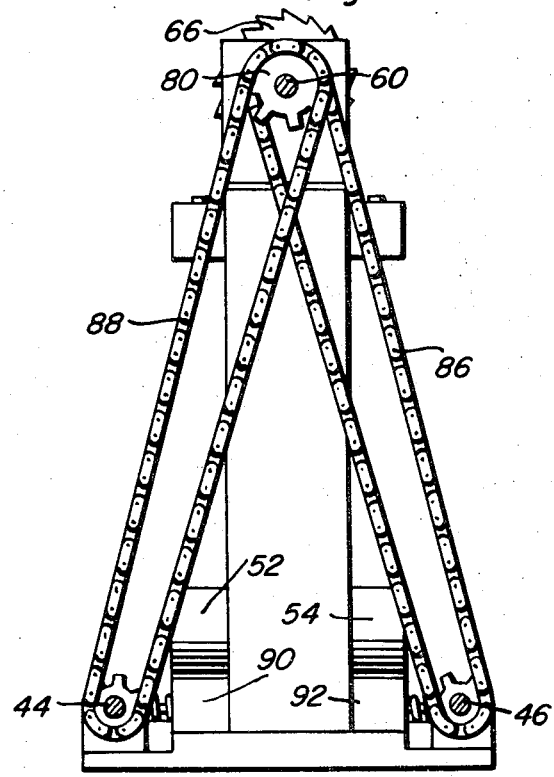
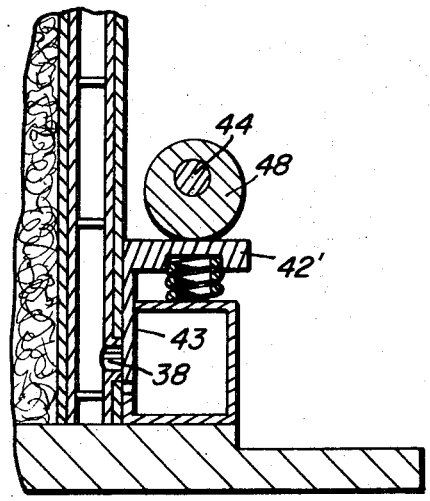
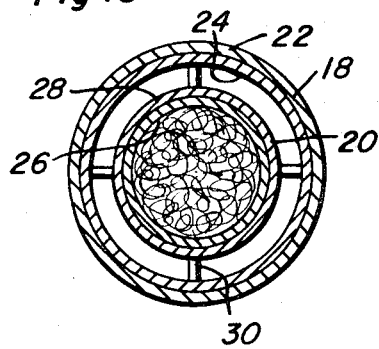
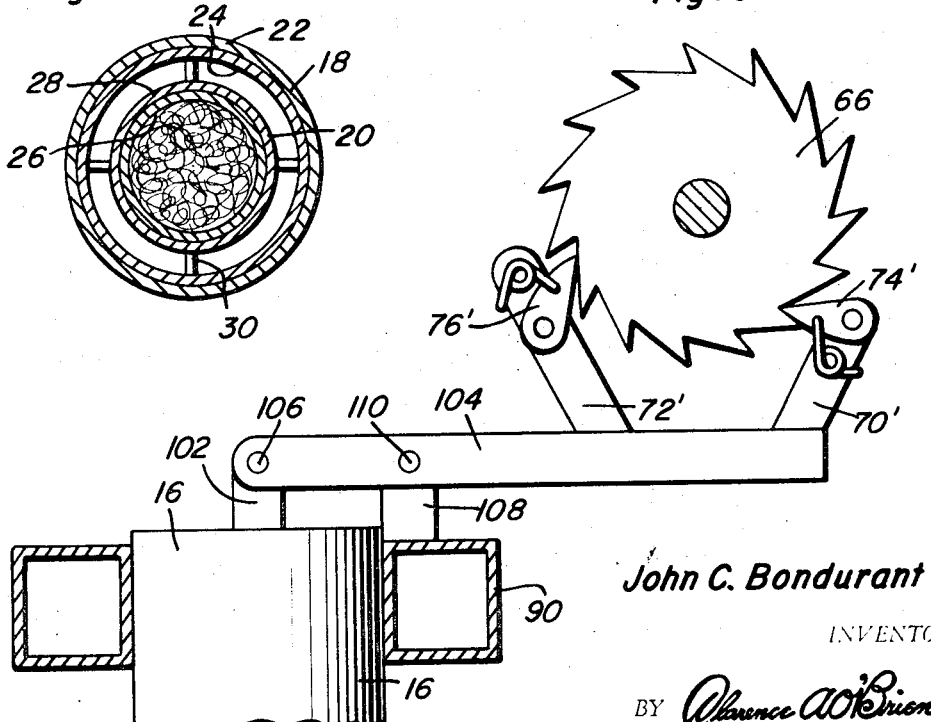
John C. Bondurant
INVENTOR.

TEMPERATURE CHANGE ACTUATED MOTOR

The thermal motor of the instant invention has been primarily designed to develop a rotational torque from supplies of heated and cool air and/or liquids.

Although the motor may utilize heated and chilled fluids which are artificially heated and chilled by powered heating and cooling assemblies, the thermal motor may most efficiently be utilized in conjunction with fluid supply sources of different temperatures which occur naturally or are by-products of heat generating and/or cooling apparatuses whose primary functions are other than to power the motor of the instant invention.

The main object of this invention is to provide a thermal motor capable of utilizing supplies of heated and cooled fluids to generate rotational torque.

Another object of this invention, in accordance with the immediately preceding object, is to provide a thermal motor constructed in a manner whereby elongated members of metal or other materials having a relatively high coefficient of expansion may be subject alternately cold and heat and the expansion and contraction of these members may be harnessed to rotate a power shaft operatively associated therewith.

Still another object of this invention is to provide a thermal motor including means, driven by the power shaft of the motor, for automatically controlling the passage of heating and cooling fluids to the elongated members.

A final object of this invention to be specifically enumerated herein is to provide a thermal motor which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of a preferred embodiment of the fluid motor of the instant invention;

FIG. 2 is a top plan view of the thermal motor;

FIG. 3 is an end elevational view of the thermal motor as seen from the left sides of FIGS. 1 and 2;

FIG. 4 is an enlarged fragmentary transverse vertical sectional view taken substantially upon the plane indicated by the section line 4—4 of FIG. 1;

FIG. 5 is a fragmentary transverse vertical sectional view taken substantially upon a plane passing through the upper portion of the motor and illustrating the manner in which one of the expansible and contractible tubes is drivingly connected to the corresponding ratchet wheel on the power shaft of the motor;

FIG. 6 is a fragmentary vertical section view similar to FIG. 5 but illustrating the various parts of the motor in different relative positions;

FIG. 7 is a fragmentary vertical sectional view illustrating a modified form of cam actuated control valve for controlling the flow of heated and cooled fluids through the expansion tubes of the motor;

FIG. 8 is a fragmentary enlarged horizontal sectional view taken substantially upon a plane passing through one of the expandible tubes of the motor; and FIG. 9 is a fragmentary transverse vertical sectional view illustrating a modified form of drive connection between the expandible tubes of the motor and the power or drive shaft of the motor.

Referring now more specifically to the drawings, the numeral 10 generally designates the thermal motor of the instant invention. The motor 10 includes a base 14 from which a plurality of side-by-side upstanding tube assemblies 16 are supported. The tube assemblies 16 are arranged in a row and extend longitudinally of the elongated base. In addition, each of the tube assemblies includes an outer tube section 18 and an inner tube section 20. The outer tube section 18 consists of an outer tube element 22 constructed of a strength providing metal and an inner tube element 24 bonded to the tube element 22 and constructed of a material having a high coefficient of expansion and which readily transmits heat. The inner tube section 20 is similarly constructed in that it includes an inner tube element 26 constructed of a strength providing metal and an outer tube element 28 bonded to the outer surface of the inner tube element 26 and constructed of a material having a high coefficient of expansion and comprising a good conductor of heat.

If it is desired, the inner tube section 20 may comprise an inner solid rod-like member in lieu of the tube element 26 and constructed of a material having a high coefficient of expansion and the tube element 28 may be bonded to the outer surface of such a rod member. However, in order to accomplish a reasonably rapid change in temperature of the inner tube section 20, a greater amount of expansion or contraction throughout the length of the inner tube section 20 may be achieved by utilizing the inner tube element 26 as opposed to a solid rod.

The outer and inner tube sections 18 and 20 are braced relative to each other by means of bracing elements 30 spaced circumferentially about and along each tube assembly and the spacing 32 in which the bracing elements 30 are disposed and defined between the outer and inner tube sections 18 and 20 defines an air passage.

Hot and cold fluid manifolds 34 and 36 are supported from the base 14 in any convenient manner and ports 38 formed through the outer tube sections 18 and the adjacent wall of the hot fluid manifold 34 are provided for communicating the interior of the manifold 34 with each of the spaces 32. In addition, ports 40 are also formed through the opposite sides of the outer tube sections 18 and the adjacent wall of the cold manifold 36 for communicating the interior of the manifold 36 with the spaces 32.

The manifolds 34 and 36 include spring urged valves 42 supported therefrom for opening and closing the ports 38 and 40 and a pair of cam shafts 44 and 46 are journalled along opposite sides of the base 14 in any convenient manner and include lobes 48 and 50 against which the adjacent ends of the valves 42 ride.

With attention now invited more specifically to FIG. 1 of the drawings as well as FIG. 2, the front end of the machine 10 includes a pair of opposite side blower assemblies 52 and 54 including outlets 56 and 58 communicated with and opening into the forward ends of the manifolds 34 and 36. The opposite or rear ends of the manifolds 34 and 36 are closed. Of course, the blower assembly 54 is communicated with any suitable source of cool air or gas and the blower assembly 52 is communicated with any suitable source of heated air or gas (not shown).

An upper drive shaft 60 is journalled above the upper ends of the tube assemblies 16 by means of opposite end supports 62 and 64 projecting upwardly from the base 14 and the drive shaft 60 includes a ratchet wheel 66 for each of the tube assemblies 16, each ratchet wheel 66 being generally centered over the corresponding tube assembly 16.

The upper ends of the tube assemblies 16 are closed by means of a top wall 68 and each top wall 68 includes a pair of upwardly divergent support arms 70 and 72 from which a pair of spring urged ratchet dogs 74 and 76 are oscillatably supported. Each pair of ratchet dogs 74 and 76 is engaged with the toothed periphery of the corresponding ratchet wheel 66 on opposite sides thereof and the rear end of the drive shaft 60 includes a pair of drive sprockets 78 and 80 aligned with corresponding sprockets 82 and 84 carried by the rear ends of the cam shafts 44 and 46, a first chain 86 being trained about the sprocket wheels 78 and 82 and a second chain 88 being trained about the sprocket wheels 80 and 84 whereby rotation of the drive shaft 60 will cause rotation of the cam shaft 44 and 46.

The lobes 48 and 50 on the shafts 44 and 46 are positioned thereon in relatively angularly displaced positions whereby the valves associated with the cam shaft 44 will be alternately actuated upon rotation of the latter and the valves 42 associated with the shaft 46 will be alternately actuated upon rotation of the shaft 46.

A pair of exhaust manifolds 90 and 92 extend along opposite sides of the row of tube assemblies 16 and are supported from the opposite end supports 62. The exhaust manifolds 90 and 92 include slots 94 with which exhaust ports 96 formed in the upper ends of the outer tube sections 18 are registered and the manifolds 90 and 92 are communicated with alternate tube assemblies 16 via the slots 94 and ports 96. The ends of the manifolds 90 and 92 at the rear of the machine 10 are closed and the ends of the manifolds 90 and 92 at the front of the machine 10 may open to the atmosphere or any suitable discharge point. Further, the discharge ends of the manifolds 90 and 92 have adjustable dampers 98 disposed therein for controlling the rate of discharge of fluids from the manifolds 90 and 92 and thus slowing down and accelerating the flow of fluids upwardly through the spaces 32 between the outer and inner tube sections 18 and 20.

In operation, as heated air supplied to the blower assembly 52 is pumped through the manifold 34, those ports 38 which are open duct the heated air into the corresponding spaces 32 and the associated outer and inner tube sections 18 and 20 expand whereupon the corresponding ratchet pawls 76 rotate the corresponding ratchet wheel 66 in a clockwise direction as illustrated in FIG. 5 of the drawings while the opposite ratchet pawls 74 slip over the teeth of the ratchet wheel 66. Of course, cool air or gases are pumped into the manifold 36 from the blower assembly 54 and those ports 40 which are open allow the passage of cool air from the manifold 36 into the corresponding spaces 32 and the associated outer and inner tube sections 18 and 20 contract so that the corresponding pawls 74 rotate the associated ratchet wheels 66 in a clockwise direction as viewed in FIG. 5 of the drawings while the opposite ratchet pawls 76 slip over the teeth of the ratchet wheels 66. Thus, inasmuch as all of the ports 38 and 40 are opened at different intervals, the shaft 60 is continuously rotated in a clockwise direction as viewed in FIGS. 5 and 6 of the drawings. Of course, rotation of the shaft 60 causes rotation of the cam shafts 44 and 46 and thereby actuates the valves 42 to open and close the ports 38 and 40 in sequence.

The elements 30 providing bracing between the outer tube sections 18 and the inner tube sections 20 also serve to cause turbulence in the air or gases being pumped upwardly through the spaces 32 and thus effect a greater transfer of heat between the pump air and/or gases and the outer and inner tube sections 18 and 20. The dampers 98 may be partially closed if it is desired to slow down the flow of air and/or gases through the spaces 32.

With attention now invited more specifically to FIG. 7 of the drawings, there will be seen a modified form of valve 42' which is also spring urged. The valves 42' include gate portions 43 thereof for covering and uncovering the associated ports 38 and 40, the latter not being illustrated.

With attention now invited more specifically to FIG. 9 of the drawings, there will be seen a modified form of motion transmitting apparatus for driving the sprocket wheels 66 from the upper ends of the tube assemblies 16. When the assembly of FIG. 9 is utilized, the upper ends of the tube assemblies 16 are provided with mounting lugs 102 to which corresponding ends of lever arms 104 are pivotally secured as at 106 and similar mounting lugs 108 are provided on the exhaust manifold 90 to which intermediate portions of the lever arms 104 are pivoted as at 110. Then, a pair of support arms 70' and 72' corresponding to the support arms 70 and 72 and provided with spring urged ratchet dogs 74' and 76' are supported from the outer ends of the lever arms 104 for coaction with the ratchet wheels 66. However, inasmuch as the length of the lever arms 104 from the pivot point 110 to the support arms 70' and 72' is greater than the length of the lever arms 104 between the pivot connections 106 and 110, vertical movement by the upper ends of the tube assemblies 16 due to expansion and contraction of the tube assemblies 16 is amplified, thereby enabling the machine 10 to operate at a greater speed and with the associated valves 42 cycled at a faster rate.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A thermal motor including a base, an elongated expandible and contractible member supported at one end from said base and having its other end free of support from said base, said elongated member being constructed of a material having a high coefficient of expansion, air passage means operatively associated with said elongated member for alternately passing heated and cool air along and in good heat transfer relation with said elongated member, said air passage means including opposite inlet and outlet ends, a power shaft journalled from said base and including at least one ratchet wheel mounted thereon for rotation therewith, means carried by the other end of said elongated member for movement therewith relative to said base upon expansion and contraction of said elongated member and ratchet dog means carried by said means on said other end of said elongated member and operatively associated with opposite sides of said ratchet wheel for continuously driving the latter, and thus said shaft, in the same direction in response to contraction and expansion of said elongated member, and means operative in response to rotation of said drive shaft to alternately supply said inlet of said passage means with hot and cold fluids under pressure for passage through said passage means.

2. The combination of claim 1 wherein said thermal motor includes a plurality of side-by-side and generally parallel elongated members disposed in a row, said shaft being journalled for rotation about an axis generally paralleling said row and including a plurality of ratchet wheels, each of said other ends of said elongated members having a pair of ratchet dog means operatively associated therewith for coaction with the corresponding ratchet wheel.

3. The combination of claim 2 wherein said means operative to alternately supply heated and cold fluids to said inlet means includes means operative to supply said fluids to said inlet means in staggered relation.

4. The combination of claim 3 wherein said outlet ends of said air passage means are communicated with at least one exhaust manifold, said exhaust manifold including an outlet end portion having fluid flow control valve means operatively associated therewith for variably restricting the discharge of exhaust fluids from said manifold.

5. The combination of claim 2 wherein said inlet ends of said air passage means include inlet ports, said means operative in response to rotation of said drive shaft including cam actuated poppet valves operatively associated with said ports, the operating cams for said poppet valves being supported from at least one cam shaft journalled from said support and driven from said drive shaft.

6. The combination of claim 2 wherein said inlet ends of said air passage means include inlet ports, said means operative in response to rotation of said drive shaft including slide valves operatively associated with said ports for opening and closing the latter, a cam shaft journalled from said support and having cams thereon operatively associated with said slide valves for opening and closing the latter, said cam shaft being driven from said drive shaft.

7. The combination of claim 1 wherein said elongated member comprises concentric telescoped tube sections, said air passage means being defined between the outer surface of the inner tube section and the inner surface of the outer tube section.

8. The combination of claim 7 wherein said outer tube section includes an outer tube element constructed of a strength providing metal and an inner tube element bonded thereto constructed of a material having a large coefficient of expansion and good heat transfer properties, said inner tube section comprising an inner tube element constructed of a strength providing metal and an outer tube element bonded thereto constructed of a material having a large coefficient of expansion and having good heat transfer properties.

9. The combination of claim 8 wherein said thermal motor includes a plurality of side-by-side and generally parallel elongated members disposed in a row, said shaft being journalled for rotation about an axis generally paralleling said row and including a plurality of ratchet wheels, each of said other ends of said elongated members having a pair of ratchet dog means operatively associated therewith for coaction with the corresponding ratchet wheel.

10. The combination of claim 9 wherein said means operative to alternately supply heated and cold fluids to said inlet means includes means operative to supply said fluids to said inlet means in staggered relation.

11. The combination of claim 1 wherein said ratchet dog means are supported from said other end of said elongated member by movement multiplying means imparting greater movement of said ratchet dog means relative to said base in response to a lesser amount of movement of said other end of said elongated member relative to said base due to expansion and contraction of said elongated member.

12. The combination of claim 1 wherein said means carried by said other end of said elongated member comprise a pair of stationary support arms supported from said other end of said support member from whose free ends said ratchet dog means are pivotally supported.

* * * * *